(12) United States Patent
Akaike et al.

(10) Patent No.: US 7,484,797 B2
(45) Date of Patent: Feb. 3, 2009

(54) HEAD RESTS

(75) Inventors: Fumitoshi Akaike, Nisshin (JP); Seiya Nishimura, Okazaki (JP); Fumio Yajima, Sakura (JP); Nobumasa Misaki, Sakura (JP)

(73) Assignees: Toyota Boshoku Kabushiki Kaisha, Aichi-ken (JP); Fujikura Ltd., Tokyo (JP)

( * ) Notice: Subject to any disclaimer, the term of this patent is extended or adjusted under 35 U.S.C. 154(b) by 137 days.

(21) Appl. No.: 11/319,027

(22) Filed: Dec. 27, 2005

(65) Prior Publication Data

US 2006/0175881 A1    Aug. 10, 2006

(30) Foreign Application Priority Data

Dec. 28, 2004    (JP) .............................. 2004-380130

(51) Int. Cl.
*B60N 2/42* (2006.01)
*B60N 2/48* (2006.01)

(52) U.S. Cl. ................................................. 297/216.12
(58) Field of Classification Search .............. 297/216.1, 297/216.12
See application file for complete search history.

(56) References Cited

U.S. PATENT DOCUMENTS

| | | | | |
|---|---|---|---|---|
| 5,694,320 A | * | 12/1997 | Breed | 701/45 |
| 5,927,804 A | * | 7/1999 | Cuevas | 297/216.12 |
| 5,975,637 A | * | 11/1999 | Geuss et al. | 297/391 |
| 6,088,640 A | * | 7/2000 | Breed | 701/45 |
| 6,402,195 B1 | | 6/2002 | Eisenmann et al. | |
| 6,607,242 B2 | | 8/2003 | Estrada et al. | |
| 6,746,078 B2 | | 6/2004 | Breed | |
| 7,072,856 B1 | * | 7/2006 | Nachom | 705/26 |
| 7,134,688 B2 | * | 11/2006 | Takagi et al. | 280/735 |
| 2002/0089157 A1 | * | 7/2002 | Breed et al. | 280/735 |
| 2007/0085400 A1 | * | 4/2007 | Terada et al. | 297/391 |

FOREIGN PATENT DOCUMENTS

| | | | |
|---|---|---|---|
| JP | 2000 233713 | | 8/2000 |
| JP | 2002039739 A | * | 2/2002 |
| JP | 2004 122856 | | 4/2004 |

* cited by examiner

*Primary Examiner*—Joseph F Edell
(74) *Attorney, Agent, or Firm*—Patterson, Thuente, Skaar & Christensen, P.A.

(57) ABSTRACT

A head rest of a vehicle seat may include a head support portion for supporting a head of a passenger, and a drive unit for moving the head support portion. The drive unit has a moving mechanism that is arranged and constructed to move the head support portion vertically and back and forth relative to the vehicle seat, a head detecting device provided to the head support portion so as to detect a clearance between the passenger head and the head support portion and to generate a control signal representative of the detected clearance, and a controller that can control the moving mechanism. The controller controls the moving mechanism so as to move the head support portion to a first proximity position in which the head detecting device may have a predetermined sensitivity relative to passenger head if the head support portion does not reach the first proximity position. The controller further controls the moving mechanism based on the control signal from the head detecting device so as to move the head support portion to a second proximity position which corresponds to an optimal proximity position relative to the passenger head.

8 Claims, 9 Drawing Sheets

HEAD RESTS

BACKGROUND OF THE INVENTION

1. Field of the Invention

The present invention relates to head rests of vehicle seats. More particularly, the present invention relates to head rests of vehicle seats that can increase restraint performance for the heads of passengers when a vehicle collision is sensed or predicted.

2. Description of the Related Art

A head rest of a vehicle seat that can be appropriately positioned relative to a head of a passenger is already known. Such a head rest (an active head rest) can increase restraint performance for the passenger head when a vehicle collision is sensed or predicted. The head rest is taught, for example, by U.S. Pat. No. 6,402,195.

In the known head rest, the head rest includes capacitance type sensors that are embedded in a main body of the head rest. The sensors are arranged and constructed to detect the position of the passenger head. Also, the head rest main body is constructed to move vertically (up and down) toward the passenger head based on a signal from the sensor. That is, the head rest main body can move. closer to the passenger head so as to be appropriately positioned relative to the passenger head. Thus, the passenger head can be suitably held by the head rest main body when a vehicle actually collides. As a result, the passenger can be prevented from suffering a whiplash injury during a vehicle collision.

Typically, the capacitance type sensors used in the known head rest are non-contacting sensors that can detect the position of the passenger head without contacting the passenger head. However, such sensors cannot accurately detect the passenger head position if the sensors are positioned away from the passenger head over a desired distance. Therefore, if the head rest main body is positioned excessively away from the passenger head when the passenger is sitting on a vehicle seat, the head rest main body cannot be moved or actuated. Consequently, in such a case, the head rest main body cannot be appropriately positioned relative to the passenger head.

SUMMARY OF THE INVENTION

It is, accordingly, one object of the present invention to provide improved head rests for a vehicle, in particular, to provide head rests in which a head rest main body can always be appropriately positioned relative to a head of a passenger when the passenger is sitting on a vehicle seat.

For example, in one aspect of the present invention, a head rest of a vehicle seat may include a head support portion for supporting the head of a passenger, and a drive unit for moving the head support portion. The drive unit has a moving mechanism that is arranged and constructed to move the head support portion vertically and back and forth relative to the vehicle seat, a head detecting device provided to the head support portion so as to detect a clearance between the passenger head and the head support portion and to generate a control signal representative of the detected clearance, and a controller that can control the moving mechanism. The controller controls the moving mechanism so as to move the head support portion to a first proximity position in which the head detecting device may have a predetermined sensitivity relative to a passenger head if the head support portion does not reach the first proximity position. The controller further controls the moving mechanism based on the control signal from the head detecting device so as to move the head support portion to a second proximity position which corresponds to an optimal proximity position relative to the passenger head.

According to this embodiment, the moving mechanism may be controlled after the sensitivity of the head detecting device reaches a predetermined value. Therefore, the moving mechanism can be accurately controlled based on the control signal from the head detecting device. As a result, the head support portion can be reliably positioned at the optimal proximity position relative to the passenger head. Thus, the passenger head can be suitably held by the head support portion when a vehicle collides.

Optionally, the passenger head may be scanned by moving the head detecting device relative to the passenger head in order to obtain passenger head data.

In this case, the moving mechanism can be controllably moved based on the control signal from the head detecting device and the obtained passenger head data. Therefore, the head support portion can be more reliably positioned at the optimal proximity position.

Other objects, features and advantages of the present invention will be readily understood after reading the following detailed description together with the accompanying drawings and the claims.

DETAILED DESCRIPTION OF THE INVENTION

A representative example of the present invention has been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

A detailed representative embodiment of the present teachings is shown in FIG. 1 to FIG. 13.

Figure 1:
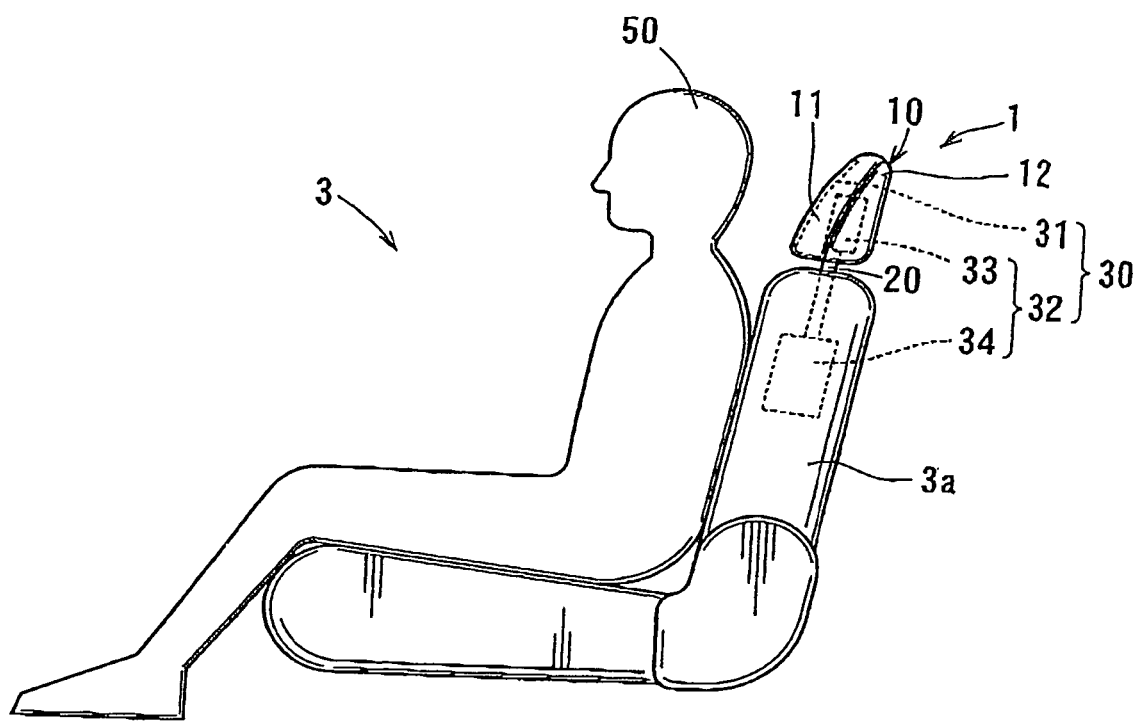
FIG. 1 is a side view of a vehicle seat having a head rest according to a representative embodiment of the present invention, in which a passenger is sitting on the vehicle seat.
Figure 10:
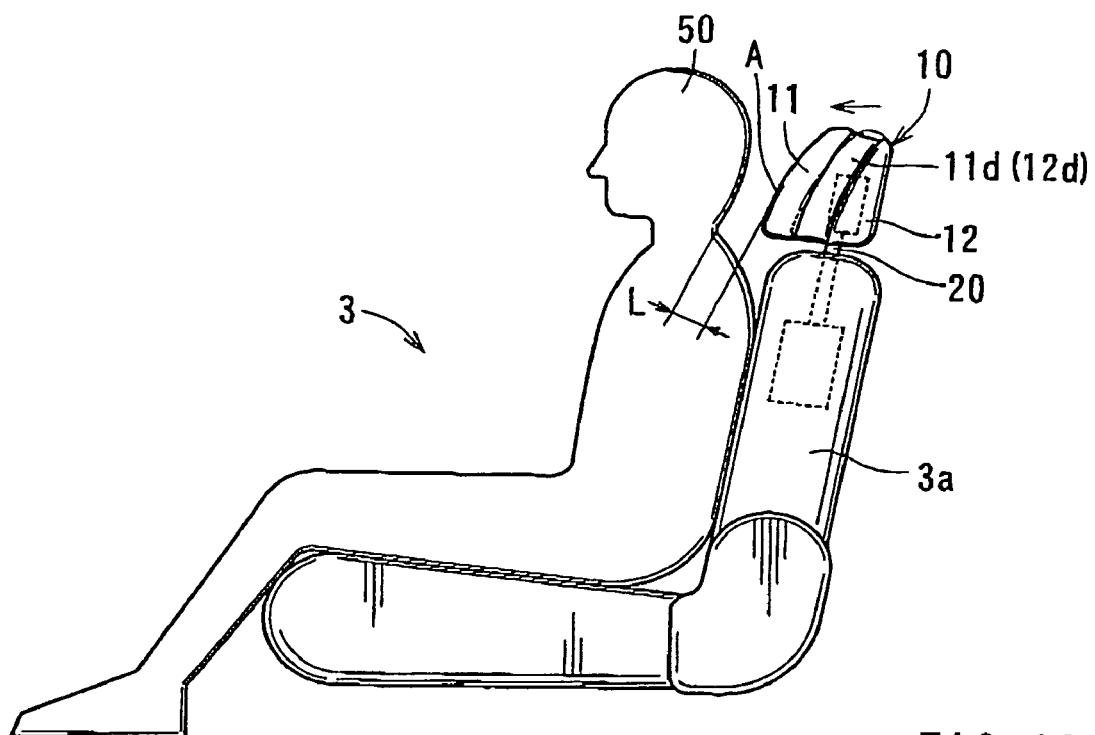
FIG. 10 is a side view similar to FIG. 1, illustrating a condition in which the front portion moves to the provisional proximity position.
Figure 11:
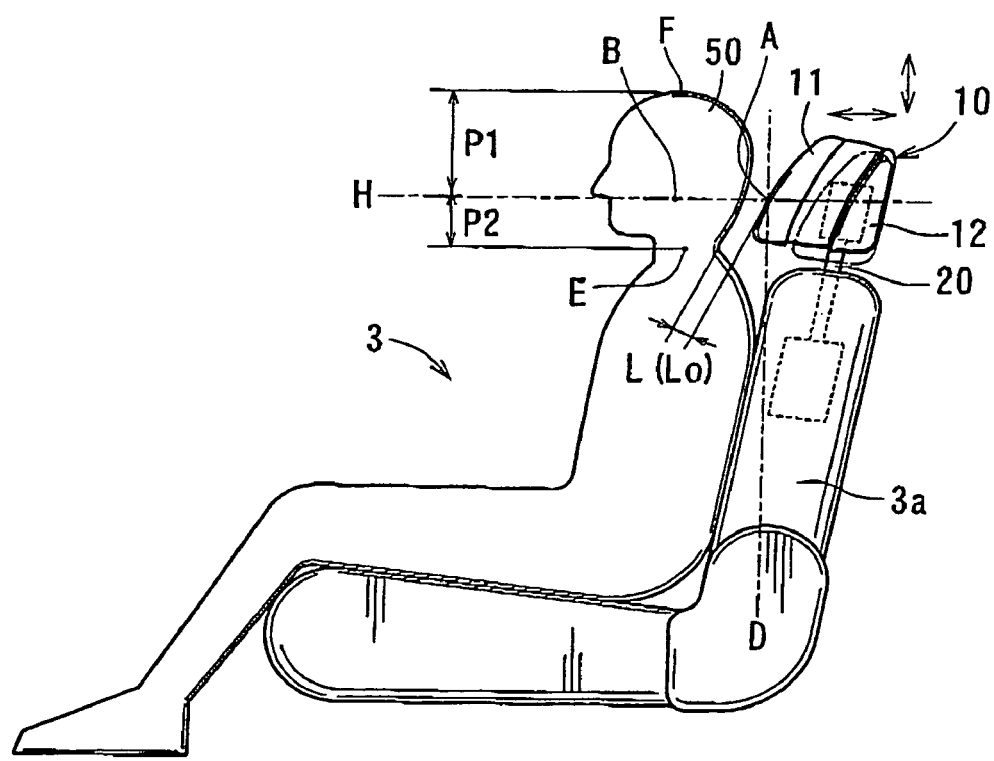
FIG. 11 is a side view similar to FIG. 10, illustrating a condition in which the front portion moves to the optimal proximity position.
Figure 12:
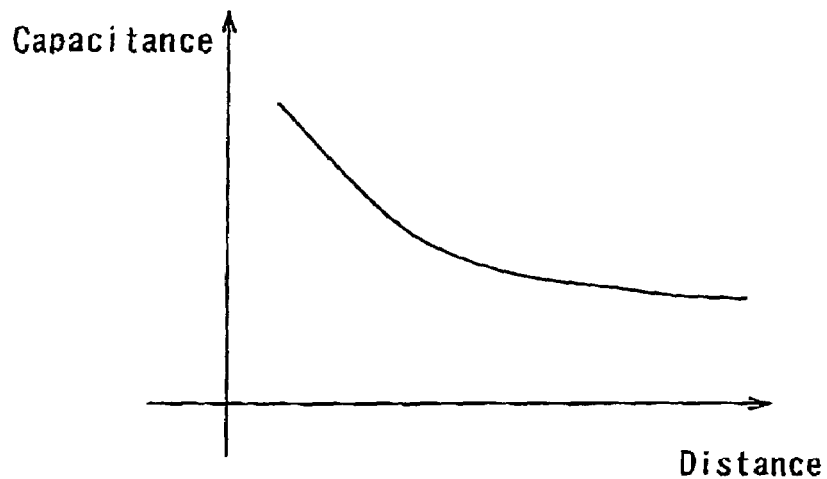
FIG. 12 is a graph illustrating changes of capacitance of a head sensor as a distance between a passenger head and the head sensor changes.
Figure 13:
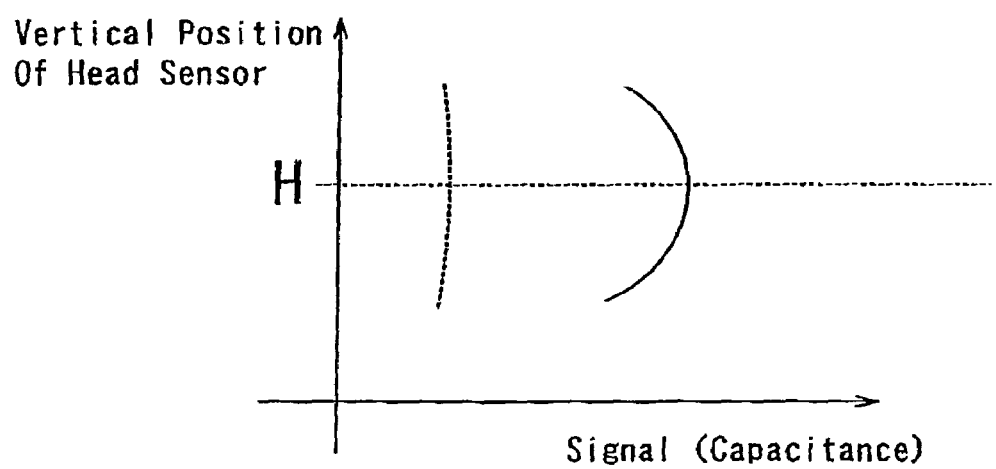
FIG. 13 are graphs illustrating a relationship between vertical positions of the head sensor relative to the passenger head and the capacitance of the head sensor.

As best shown in FIGS. 1, 10 and 11, a representative head rest 1 (an active head rest) includes a main body 10 and a pair of head rest stays 20 coupled to the main body 10. The head rest stays 20 are vertically movably connected to a seat back 3a of a vehicle seat 3 so that the head rest 1 (the main body 10) is movably attached to the seat back 3a. The main body 10 is composed of two portions, i.e., a relatively immovable rear portion 12 (i.e., a base portion or a first portion) that is coupled to the head rest stays 20, and a movable front portion 11 (i.e., a head support portion or a second portion) that can support a head 50 of a passenger sitting on the vehicle seat 3.

Figure 2:
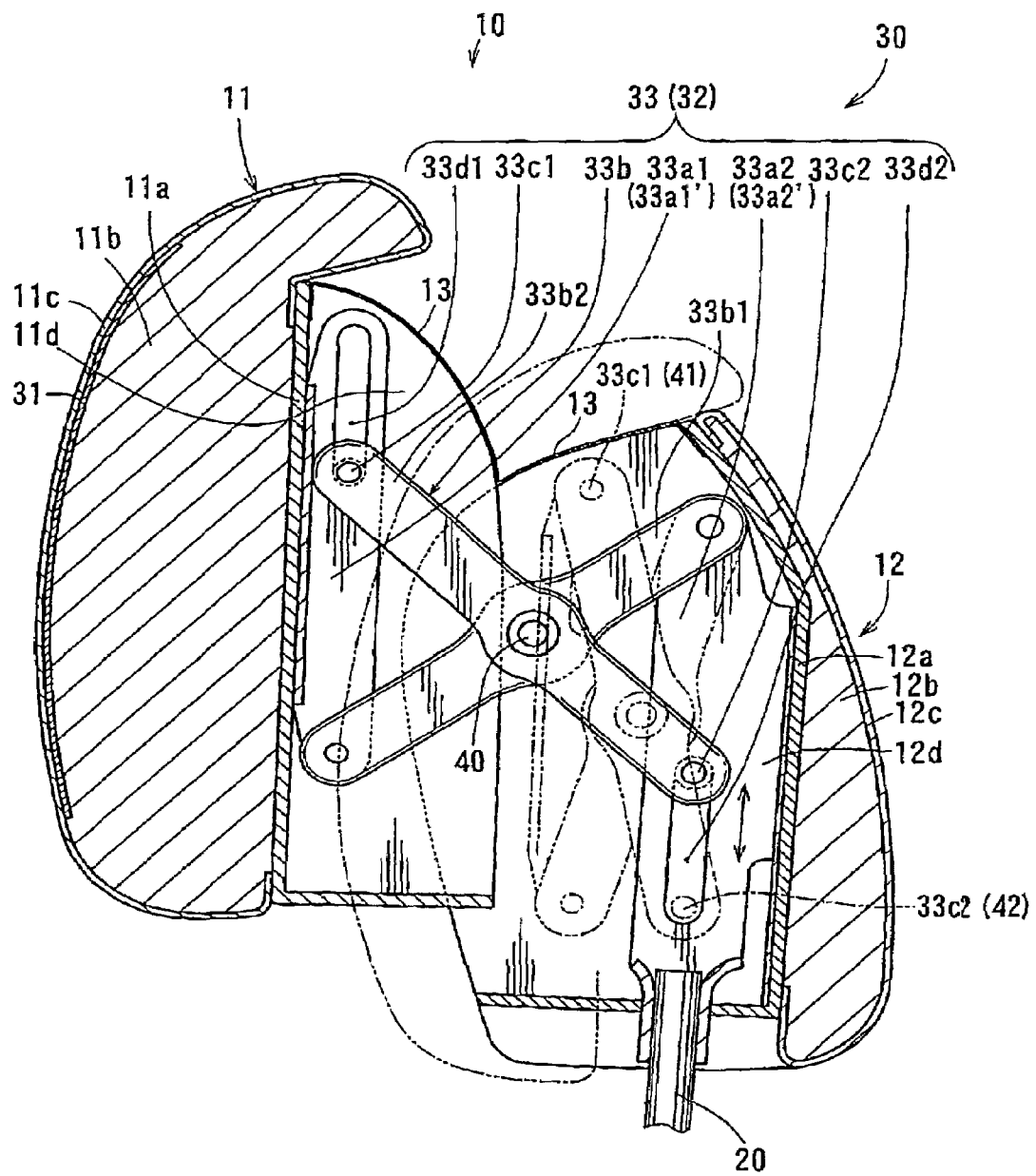
FIG. 2 is a side view of the head rest, which schematically illustrates the motion of a back and forth moving mechanism for moving a head rest front portion relative to a head rest rear portion.

As shown in FIG. 2, the rear portion 12 includes a plate-shaped rear bracket 12a, a rear shell 12c having a rear cushion pad 12b, and rear side shield members 12d that are integrally provided to the rear bracket 12a. The rear bracket 12a may preferably be made from resins. The rear bracket 12a is secured to the head rest stays 20. The rear shell 12c is attached to the rear bracket 12a while interleaving the rear cushion pad 12b. The rear shell 12c may preferably be made from leather, cloth or other such materials. The rear cushion pad 12b may preferably be made from urethane foam or other such materials. Conversely, the front portion 11 includes a plate-shaped front bracket 11a, a front shell 11c having a front cushion pad 11b, and front side shield members 11d that are integrally provided to the front bracket 11a. Similar to the rear bracket 12a, the front bracket 11a may preferably be made from resins. The front shell 11c is attached to the front bracket 11a while interleaving the front cushion pad 11b. Similar to the rear shell 12c, the front shell 11c may preferably be made from leather, cloth or other such materials. Also, the front cushion pad 11b is made from urethane foam or other such materials.

Further, the main body 10 additionally includes a cover sheet 13 that is overlaid on the front and rear side shield members 11d and 12d. The cover sheet 13 may preferably be formed from a resin film. As will be appreciated, the front and rear side shield members 11d and 12d, and the cover sheet 13, may function to conceal a back and forth moving mechanism 33 (which will be described hereinafter) that is disposed between the front and rear portions 11 and 12.

Figure 4:
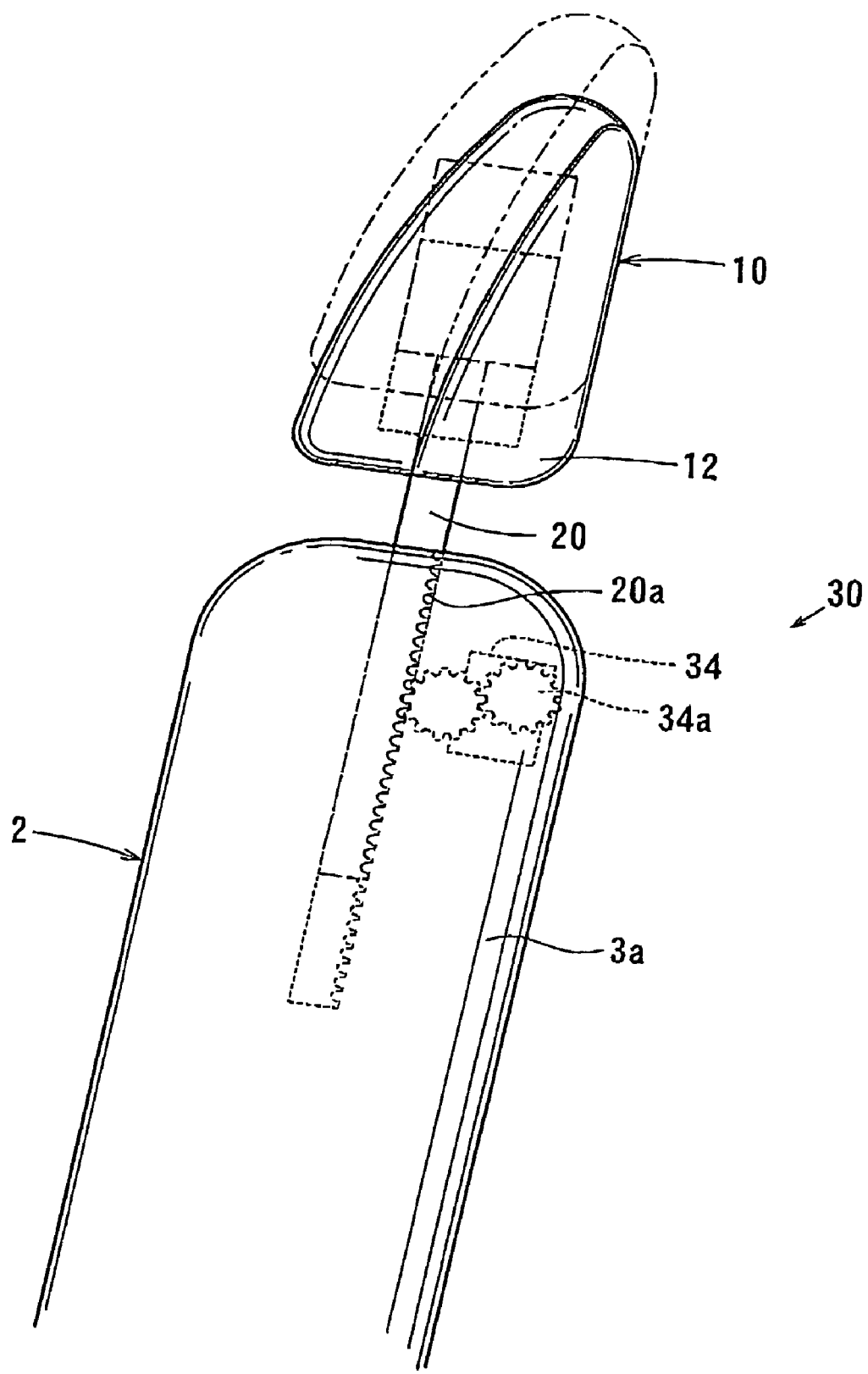
FIG. 4 is a partial side view of the vehicle seat, which schematically illustrates a vertical moving mechanism.
Figure 5:
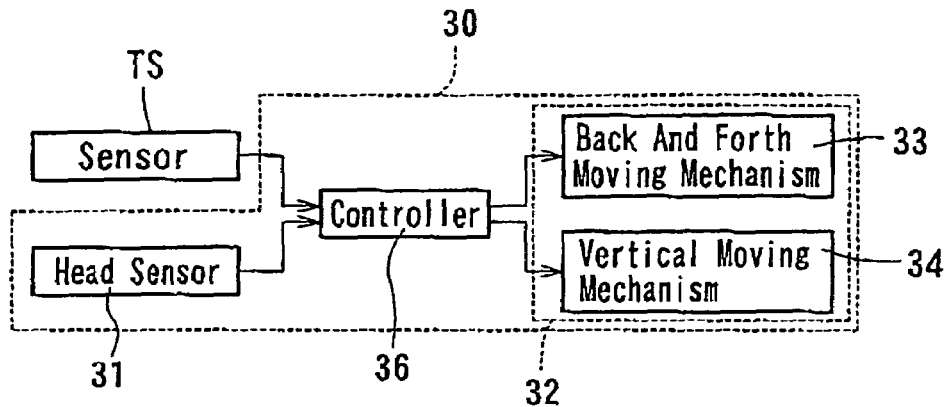
FIG. 5 is a block diagram illustrating a controlling process of the moving mechanisms.

The head rest 1 further includes a drive unit 30 for moving the front portion 11 back and forth relative to the rear portion 12 and for moving the main body 10 (the rear portion 12) vertically relative to the seat back 3a. As shown in FIG. 5, the drive unit 30 is composed of a moving mechanism 32, a head sensor 31 (i.e., a head detecting device or a supplemental detecting device) that is disposed between the front cushion pad 11b and the front shell 11c (FIGS. 1 and 2), and a controller 36 that is electrically communicated with the head sensor 31. The moving mechanism 32 includes a back and forth moving mechanism 33 (i.e., a first moving mechanism), and a vertical moving mechanism 34 (i.e., a second moving mechanism). In other words, the moving mechanism 32 is a combination of the first and second moving mechanisms 33 and 34. As shown in FIG. 2, the back and forth moving mechanism 33 interconnects the front and rear brackets 11a and 12a of the front and rear portion 11 and 12 such that the front bracket 11a (the front portion 11) can move vertically and back and forth (i.e., horizontally) relative to the rear bracket 12a (the rear portion 12). Conversely, as shown in FIG. 4, the vertical moving mechanism 34 is associated with the head rest stays 20 such that the head rest stays 20 (the head rest main body 10) can move vertically relative to the seat back 3a. Further, the first and second moving mechanisms 33 and 34 respectively have an actuator 33e and an actuator (not shown). Each of the actuators may preferably have a drive motor (not shown).

Figure 3:
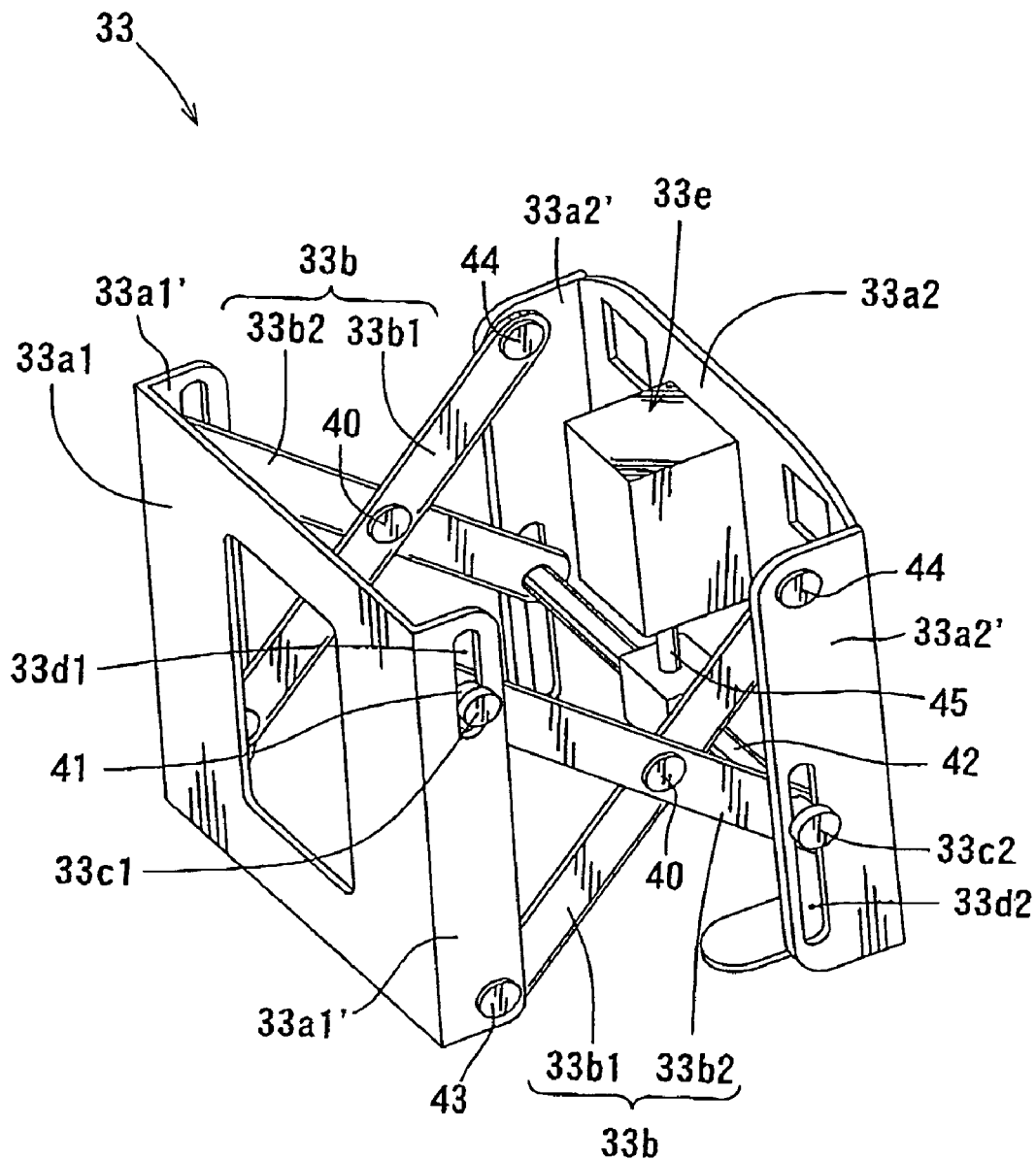
FIG. 3 is a perspective view of the back and forth moving mechanism.

As shown in FIGS. 2 and 3, the back and forth moving mechanism 33 of the moving mechanism 32 essentially consists of a rear vertical base plate 33a2, a front vertical base plate 33a1, and a pair of cross bar links 33b. As shown in FIG. 2, the rear vertical base plate 33a2 is connected to the rear bracket 12a of the rear portion 12. As best shown in FIG. 3, the rear base plate 33a2 has side folded portions 33a2' that are folded forwardly in parallel. The lower portions of the side folded portions 33a2' are respectively formed with vertically extending lower guide slots 33d2 that are laterally aligned with each other. Conversely, the front vertical base plate 33a1 is connected to the front bracket 11a of the front portion 11. The front base plate 33a1 has side folded portions 33a1' that are folded rearwardly in parallel. The upper portions of the side folded portions 33a1' are formed with vertically extending upper guide slots 33d1 that are laterally aligned with each other.

As best shown in FIG. 3, each of the cross bar links 33b is composed of outer and inner cross bars 33b2 and 33b1 (i.e., first and second cross bars) that are rotatably interconnected via pivot pin 40. The outer cross bars 33b2 of the respective pairs of cross bar links 33b are rotatably interconnected at their rear and front end portions (i.e., first and second end portions) via a first connector shaft 42 and a second connector shaft 41.

As shown in FIG. 3, the rear end portions of the outer cross bars 33b2 thus connected are respectively rotatably and slidably engaged with the lower guide slots 33d2 formed in the rear base plate 33a2 via guide pins 33c2. Also, the front end portions of the outer cross bars 33b2 thus connected are respectively rotatably and slidably engaged with the upper guide slots 33d1 formed in the front base plate 33a1 via guide pins 33c1. Conversely, the rear end portions of the inner cross bars 33b1 are respectively rotatably connected to the upper portions of the side folded portions 33a2' of the rear base plate 33a2 via pivot pins 44. Also, the front end portions of the inner cross bars 33b1 are respectively rotatably connected to the lower portions of the side folded portions 33a1' of the front base plate 33a1 via pivot pins 43. Thus, the front and rear base plates 33a1 and 33a2 are relatively operably connected via the cross bar links 33b. As a result, as shown in FIG. 2, the front and rear brackets 11a and 12a (the front and rear portions 11 and 12) are relatively operably connected via the back and forth moving mechanism 33.

Consequently, the rear end portions (first end portions) of the outer cross bars 33b2 can vertically move relative to a lower portion of the rear base plate 33a2. Similarly, the front end portions (second end portions) of the outer cross bars 33b2 can vertically move relative to an upper portion of the front base plate 33a1. Conversely, the rear end portions (first end portions) of the inner cross bars 33b1 can simply rotate relative to an upper portion of the rear base plate 33a2. Similarly, the front end portions (second end portions) of the inner cross bars 33b1 can simply rotate relative to a lower portion of the front base plate 33a1.

As shown in FIG. 3, the drive motor of the actuator 33e is attached to the rear base plate 33a2. The actuator drive motor tbus disposed is coupled to the first connector shaft 42 via a power transmission rod 45 so as to vertically move the first connector shaft 42. Therefore, the front bracket 11a (the front portion 11) can move vertically and back and forth relative to the rear bracket 12a (the rear portion 12) upon actuation of the actuator 33e. Also, although not shown, the actuator drive motor is electrically communicated with the controller 36.

As shown in FIG. 4, the vertical moving mechanism 34 is disposed or embedded in the seat back 3a. The vertical moving mechanism 34 has a gear unit 34a that engages teeth 20a formed in the head rest stays 20. Further, the actuator drive motor (not shown) is also disposed or embedded in the seat back 3a. The actuator drive motor thus disposed is coupled to the vertical moving mechanism 34 so as to actuate the gear unit 34a of the vertical moving mechanism 34. Therefore, the head rest stays 20 can vertically move relative to the seat back 3a upon actuation of the actuator. Also, although not shown, the actuator drive motor is electrically communicated with the controller 36.

In this embodiment, the head sensor 31 may preferably be a flexible plate-shaped capacitance type sensor having an electrode (not shown). As will be appreciated, the capacitance type sensor is a typical non-contacting sensor. The head sensor 31 can detect a minimum distance between the head 50 of a passenger and a center A of the front portion 11 (FIG. 10) (which distance will be hereinafter referred to as a head to head rest clearance L) and generate a signal (i.e., a control signal) representative of the detected distance. As will be recognized, the head to head rest clearance L can be determined based on changes of capacitance of the electrodes of the head sensor 31 because the capacitance of the sensor electrode may change due to electrostatic induction effects as the head to head rest clearance L changes. Typically, the capacitance type head sensor 31 may have properties shown in FIG. 12. As will be apparent from FIG. 12, the capacitance of the sensor electrode may increase as the head to head rest clearance L reduces. Also, the rate of the increase of the capacitance may increase as such a clearance reduces. Therefore, the head sensor 31 may have increased sensitivity as the head to head rest clearance L is reduced.

As previously described, the controller 36 is electrically communicated with the head sensor 31. Therefore, the controller 36 can control the actuator 33e of the first moving mechanism 33 and the actuator of the second moving mechanism 34 based on the signal generated by the head sensor 31, thereby controlling the motion of the moving mechanism 32 (the first and second moving mechanisms 33 and 34).

In addition, as shown in FIG. 5, the controller 36 is connected to a sensor TS (i.e., a main detecting device). In this embodiment, the sensor TS senses that a passenger is sitting on the vehicle seat and generates a representative signal (i.e., an initiation signal). The representative signal is transmitted to the controller 36 so that the actuator drive motors of the first and second moving mechanisms 33 and 34 are actuated based on the signal from the sensor TS, thereby moving the first and second moving mechanisms 33 and 34. That is, the first and second moving mechanisms 33 and 34 can be arranged and constructed to be operated when a passenger is sitting on the vehicle seat. In this embodiment, a seatbelt switch may preferably be used as the sensor TS (the main detecting device). Therefore, an on-off signal of the seatbelt switch may preferably be used as the initiation signal.

Next, an operation of the head rest 1 (the main body 10) thus constructed will now be described in detail.

As shown by broken lines in FIG. 2, when the head rest 1 is in a normal condition, the rear portion 12 and the front portion 11 are closed or joined with each other. At this dime, the back and forth moving mechanism 33 is in an initial condition or retracted condition. In other words, the outer and inner cross bars 33b2 and 33b1 of the cross bar links 33b are in a folded condition. In this condition, the outer cross bars 33b2 are substantially vertically positioned so that the first connector shaft 42 (and the guide pins 33c2) is positioned at the lowermost position within the lower guide slots 33d2 formed in the rear base plate 33a2. Also, the inner cross bars 33b1 are substantially vertically positioned so that the second connector shaft 41 (and the guide pins 33c1) is positioned at the uppermost position within the upper guide slots 33d1 formed in the front base plate 33a1.

Conversely, as shown by solid lines in FIG. 4, when the head rest 1 is in the normal condition, the head rest stays 20 (the head rest main body 10) may preferably be lowered. At this time, the vertical moving mechanism 34 is in an initial condition or head rest stay lowering condition.

When the sensor TS (the main detecting device) senses that a passenger is sitting on the vehicle seat, the representative signal (the initiation signal) is transmitted to the controller 36. The controller 36 actuates the actuator drive motor of the back and forth moving mechanism 33 based on the transmitted signal so that the power transmission rod 45 is shifted upwardly. As a result, the first connector shaft 42, connected to the power transmission rod 45, is lifted upwardly. At this time, as shown in FIG. 3, the guide pins 33c2 (the first connector shaft 42) move upwardly along the lower guide slots 33d2. At the same time, the guide pins 33c1 (the second connector shaft 41) move downwardly along the upper guide slots 33d1. Consequently, the outer cross bars 33b2 rotate counterclockwise about the first connector shaft 42 (the guide pins 33c2) while moving upwardly. Depending upon this motion of the outer cross bars 33b2, the inner cross bars 33b1 rotate clockwise around the pivot pins 44. Thus, the outer and inner cross bars 33b2 and 33b1 of the cross bar links 33b can move toward an unfolded condition shown by solid lines in FIG. 2. As a result, the back and forth moving mechanism 33 can be shifted toward an extended condition (which corresponds to a position shown by solid lines in FIG. 2) from a retracted condition (which corresponds to a position shown by broken lines in FIG. 2).

When the back and forth moving mechanism 33 is shifted from a retracted condition toward an extended condition, the front base plate 33a1 moves from a normal position (which corresponds to a position shown by broken lines in FIG. 2) toward a projected position (which corresponds to a position shown by solid lines in FIG. 2). As will be apparent from comparing the broken lines and the solid lines in FIG. 2, at this time, the front base plate 33a1 moves forwardly and upwardly relative to the rear base plate 33a2. Consequently, as shown by solid lines in FIG. 2, the front portion 11 of the head rest main body 10 is projected forwardly and upwardly relative to the rear portion 12 of the head rest main body 10 toward the passenger head 50. In other words, the front portion 11 is projected forwardly and upwardly relative to the seat back 3a of the vehicle seat 3.

When the projected front portion 11 reaches a provisional or first proximity position relative to the passenger head 50 (e.g., FIG. 10) so that the sensitivity of the head sensor 31 sensing the passenger head 50 reaches a predetermined value (i.e., a good sensitivity value), the controller 36 stops the drive motor of the back and forth moving mechanism 33 based on a control signal from the sensor 31. Thereafter, the controller 36 actuates the drive motors of both of the back and forth moving mechanism 33 and the vertical moving mechanism 34 based on the control signal from the sensor 31, thereby appropriately controlling these moving mechanisms 33 and 34 such that the front portion 11 is positioned at an optimal or second proximity position relative to the passenger head 50 (e.g., FIG. 11). Thus, the front portion 11 of the head rest main body 10 is positioned at an optimal proximity position relative to the passenger head 50 such that the passenger head 50 can be effectively protected if the vehicle actually collides.

Next, a process for controlling the moving mechanism 32 by the controller 36 based upon the initiation signal from the sensor TS and the control signal from the head sensor 31 will now be described in detail with reference to FIGS. 6-9. Typically, the controlling process by the controller 36 is started when the ignition switch is turned on. Also, the controlling process is repeated in a desired time interval.

Figure 6:
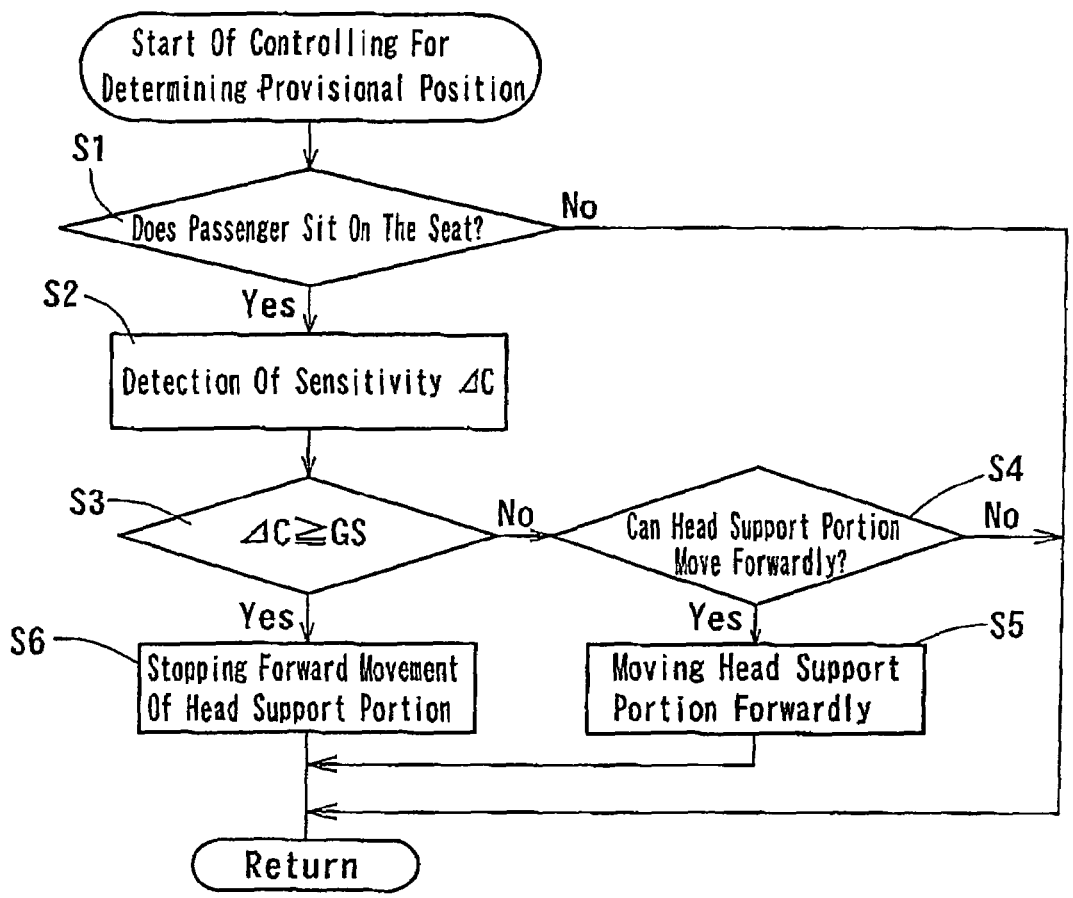
FIG. 6 is a block diagram illustrating a controlling process of the back and forth moving mechanisms for determining a provisional (first) proximity position.

First, as shown in FIG. 6, in step S1 (i.e., an initial state) the controller 36 determines if the initiation signal from the sensor TS (an ON signal of the seatbelt switch) is transmitted to the controller 36 (i.e., if the passenger is sitting on the vehicle seat and fastens a seatbelt). In step S1 if the initiation signal from the sensor TS is not transmitted to the controller 36, the controlling process by the controller 36 is terminated and is returned to an initial state (step S1). Thus, the controlling process by the controller 36 is restarted. To the contrary, in step S1 if the initiation signal is transmitted to the controller 36, in step S2 the sensitivity $\Delta C$ of the head sensor 31 is detected based on changes of capacitance of the head sensor 31, which changes depend on the head to head rest clearance L. Thereafter, in step S3 the sensor sensitivity $\Delta C$ is compared with the predetermined value or the good sensitivity value GS. When the sensor sensitivity $\Delta C$ does not reach the good sensitivity value GS, in step S4 the controller 36 determines if the front portion 11 of the head rest main body 10 can still move toward the passenger head 50. In step S4 when the front portion 11 can still move toward the passenger head 50, in step S5 the controller 36 controllably actuates the actuator 33e of the back and forth moving mechanism 33, thereby moving the back and forth moving mechanism 33 so as to move the front portion 11 relative to the rear portion 12 toward the passenger head 50. Thereafter, the controlling process by the controller 36 is terminated and is returned to an initial state (step S1). As will be recognized, the controlling process corresponding to steps S1 to S5 is repeated until the sensor sensitivity $\Delta C$ reaches the good sensitivity value GS. Conversely, in step S4 when the front portion 11 can no longer move toward the passenger head 50, the controlling process by the controller 36 is terminated and is returned to an initial state (step S1). On the contrary, in step S3 when the sensor sensitivity $\Delta C$ has already reached the good sensitivity value GS, in step S6 the controller 36 deactuates the actuator 33e, thereby stopping the back and forth moving mechanism 33 so that the motion of the front portion 11 toward the passenger head 50 is stopped.

Figure 7:
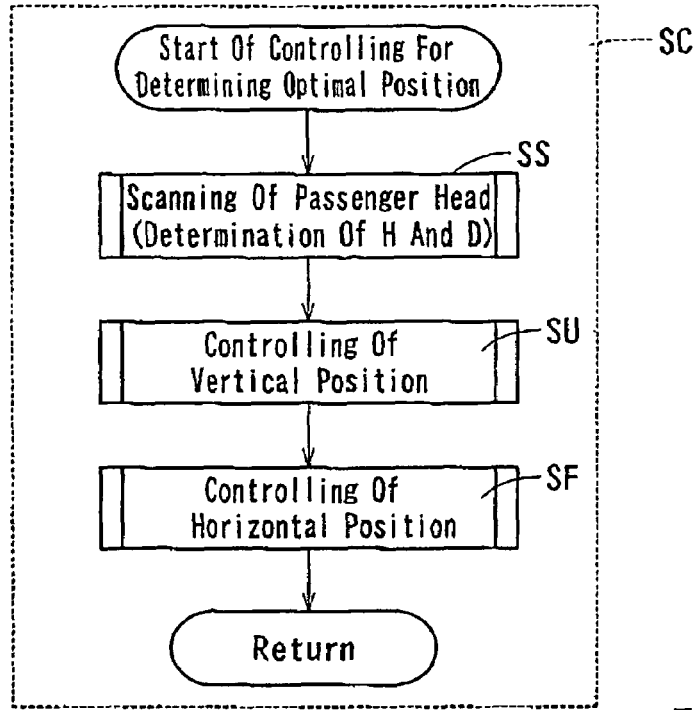
FIG. 7 is a block diagram illustrating a controlling process of the vertical moving mechanism and the back and forth moving mechanisms for determining an optimal (second) proximity position.

Thus, the front portion 11 of the head rest main body 10 is positioned at the provisional proximity position so that the head to head rest clearance L may be at a predetermined provisional distance (FIG. 10). Upon completion of provisional positioning of the front portion 11, as shown in FIG. 7, in step SC the controller 36 continues to execute the controlling process based on the control signal from the head sensor 31, thereby appropriately controlling both of the back and forth moving mechanism 33 and the vertical moving mechanism 34 in order to position the front portion 11 at the optimal proximity position (e.g., FIG. 11). As will be apparent, step SC includes three steps SS, SU and SF.

First, in step SS the controller 36 controllably moves the vertical moving mechanism 34 based on the control signal from the head sensor 31 so as to vertically move the head rest main body 10 (the front portion 11) relative to the passenger head 50. As a result, the passenger head 50 can be scanned so as to obtain data (i.e., passenger head data) corresponding to the shape of the passenger head 50. As will be recognized, when the head rest main body 10 moves vertically relative to the passenger head 50, the capacitance of the head sensor 31 that is attached to the head rest main body 10 continuously changes. Therefore, it is possible to determine the shape of the passenger head 50 by numerically converting the continuously changing capacitance of the head sensor 31. Typically, when a vertical position of the head sensor 31 relative to the passenger head 50 changes while the sensor sensitivity $\Delta C$ reaches the good sensitivity value GS, the capacitance of the head sensor 31 may change as shown by a solid line (i.e., a first graph) in FIG. 13. When the vertical position of the head sensor 31 relative to the passenger head 50 changes while the sensor sensitivity $\Delta C$ does not reach the good sensitivity value GS, the capacitance of the head sensor 31 may change as shown by a broken line (i.e., a second graph) in FIG. 13. As a result of the scanning of the passenger head 50, the controller 36 determines an optimal vertical basis H and an optimal horizontal basis D with regard to the front portion 11 of the head rest main body 10. Typically, as shown in FIG. 11, the optimal vertical basis H corresponds to a horizontal plane passing through center of gravity B of the passenger head 50. Generally, the vertical distance P1 between the center of gravity B and a top F of the passenger head 50 to the vertical distance P2 between the center of gravity B and a center E of a passenger neck is substantially 2:1. Therefore, the center of gravity B can be easily predicted by scanning the passenger head 50. Further, the optimal horizontal basis D is determined based on a predetermined optimal distance $L_o$ of the head to head rest clearance L. That is, the optimal horizontal basis D is defined as a vertical plane that passes through the central portion A of the front portion 11 when the head to head rest clearance L is at the predetermined optimal distance $L_o$. Typically, the optimal distance $L_o$ is about 5 mm.

Thereafter, in step SU the controller 36 controllably moves the vertical moving mechanism 34 so as to vertically move the front portion 11 (the head rest main body 10), thereby positioning the front portion 11 at the optimal vertical basis H. Subsequently, in step SF the controller 36 controllably moves the back and forth moving mechanism 33 so as to move the front portion 11 relative to the rear portion 12, thereby positioning the front portion 11 at the optimal horizontal basis D. Thus, the front portion 11 can be positioned at the optimal proximity position (FIG. 11). As will be appreciated, upon completion of the positioning of the front portion 11 at the optimal proximity position, the controlling process by the controller 36 is terminated and is returned to step S1.

Next, the controlling process in steps SU and SF will now be described in detail with reference to FIGS. 8 and 9.

Figure 8:
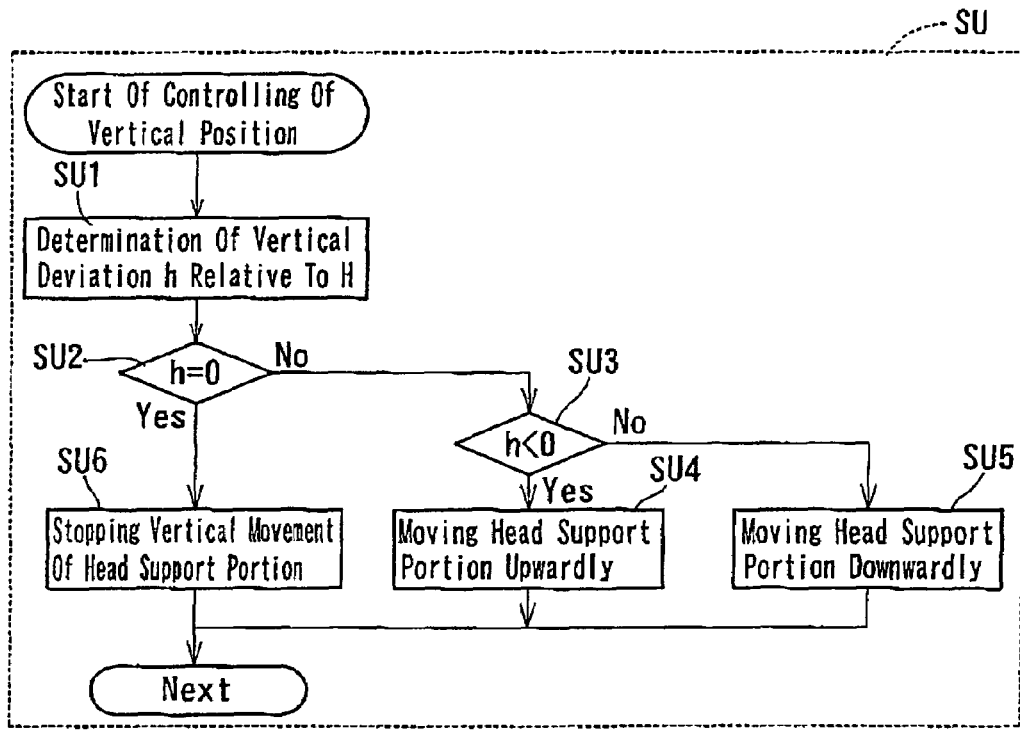
FIG. 8 is a block diagram illustrating.a controlling process of the vertical moving mechanism that is contained in the controlling process shown in FIG. 7.

First, as shown in FIG. 8, in step SU1 the controller 36 determines a vertical deviation h of the front portion 11 relative to an optimal vertical basis H based on the control signal from the head sensor 31. Thereafter, in step SU2 the controller 36 determines if the vertical deviation h is zero (i.e., if the front portion 11 of the head rest main body 10 reaches the optimal vertical basis H). In step SU2 when the vertical deviation h is not zero, in step SU3 the controller 36 determines if the vertical deviation h is less than zero (i.e., if the vertical deviation h is plus or minus). In step SU3 when the vertical deviation h is less than zero, in step SU4 the controller 36 actuates the actuator of the vertical moving mechanism 34 in a normal direction, thereby further moving the vertical moving mechanism 34 such that the front portion 11 (the head rest main body 10) is shifted upwardly. Thereafter, the controlling process by the controller 36 is returned to step SU1. Conversely, in step SU3 when the vertical deviation h is greater than zero, in step SU5 the controller 36 actuates the actuator in a reverse direction, thereby further moving the vertical moving mechanism 34 such that the front portion 11 (the head rest main body 10) is shifted downwardly. Thereafter, the controlling process by the controller 36 is returned to step SU1. As will be recognized, the controlling process corresponding to steps SU1 to SU5 is repeated until the vertical deviation h reaches zero. On the contrary, in step SU2 when the vertical deviation h is zero, in step SU6 the controller 36 deactuates the actuator, thereby stopping the vertical moving mechanism 34 so that the vertical motion of the front portion 11 (the head rest main body 10) is stopped. Thereafter, the controlling process by the controller 36 is returned to the step SU1. Further, the vertical deviation h may preferably be determined with reference to the first graph shown in FIG. 13. In addition, the determination as to whether the vertical deviation h is less than zero can be made by utilizing various kinds of methods that have been conventionally used.

Figure 9:
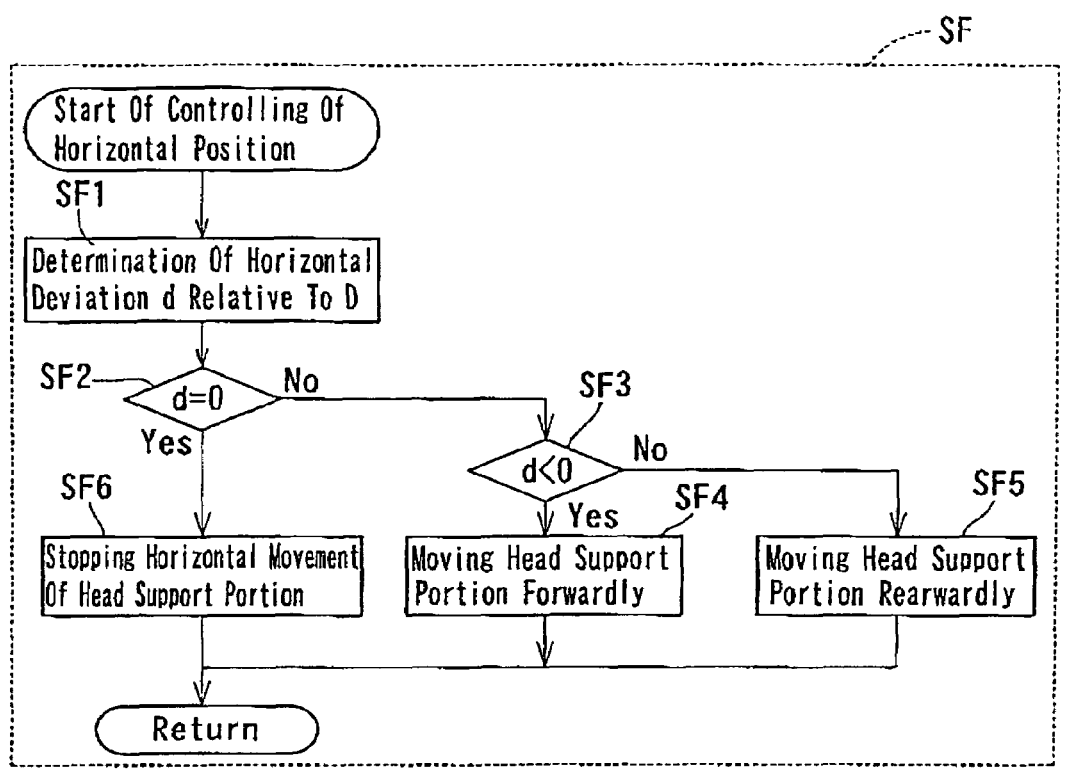
FIG. 9 is a block diagram illustrating a controlling process of the back and forth moving mechanism that is contained in the controlling process shown in FIG. 7.

Second, as shown in FIG. 9, in step SF1 the controller 36 determines a horizontal deviation d of the front portion 11 relative to optimal horizontal basis D based on the control signal from the head sensor 31. Thereafter, in step SF2 the controller 36 determines if the horizontal deviation d is zero (i.e., if the front portion 11 of the head rest main body 10 reaches the optimal horizontal basis H). In step SF2 when the horizontal deviation d is not zero, in step SF3 the controller 36 determines if the horizontal deviation d is less than zero (i.e., if the horizontal deviation d is plus or minus). In step SF3 when the horizontal deviation d is less than zero, in step SF4 the controller 36 actuates the actuator 33e of the back and forth moving mechanism 33 in a normal direction, thereby further moving the back and forth moving mechanism 33 such that the front portion 11 is shifted forwardly toward the passenger head 50. Thereafter, the controlling process by the controller 36 is returned to step SF1. Conversely, in step SF3 when the horizontal deviation d is greater than zero, in step SF5 the controller 36 actuates the actuator 33e in a reverse direction, thereby further moving the back and forth moving mechanism 33 such that the front portion 11 is shifted rearwardly away from the passenger head 50. Thereafter, the controlling process by the controller 36 is returned to step SF1. As will be recognized, the controlling process corresponding to steps SF1 to SF5 is repeated until the horizontal deviation d reaches zero. On the contrary, in step SF2 when the horizontal deviation d is zero, in step SF6 the controller 36 deactuates the actuator 33e, thereby stopping the back and forth moving mechanism 33 so that the horizontal motion of the front portion 11 is stopped. Thereafter, the controlling process by the controller 36 is returned to the step SF1.

Thus, the front portion 11 of the head rest main body 10 is positioned at the optimal proximity position (FIG. 11).

According to this embodiment, the controller 36 can controllably move the moving mechanism 32 based on the control signal from the head sensor 31 after the sensitivity $\Delta C$ of the head sensor 31 reaches the good sensitivity value GS (i.e., after the front portion 11 of the head rest main body 10 is positioned at the provisional (first) proximity position shown in FIG. 10). Therefore, it is possible to accurately control the moving mechanism 32 even if the head sensor 31 has a limited sensitivity. As a result, the front portion 11 (the head rest main body 10) can be reliably positioned at the optimal (second) proximity position shown in FIG. 11. Further, the moving mechanism 32 includes the back and forth moving mechanism 33 and the vertical moving mechanism 34. This may also lead to accurate positioning of the front portion 11 (the head rest main body 10).

Naurally, various changes and modifications may be made to the present teachings without departing from the scope of the invention. For example, in this embodiment, although a capacitance type sensor is used as the head sensor 31 (the head detecting device), various types of non-contacting sensors can be used as the bead sensor 31. Examples of the head sensor 31 may includes an ultrasonic sensor, a photoelectronic sensor and an image sensor that can detect the position of the front portion 11 (the head rest main body 10) relative to the passenger head 50.

In this embodiment, the seatbelt switch is used as the sensor TS. However, an additionally provided special switch can be used as the sensor TS, if required.

In this embodiment, the controller 36 is arranged and constructed to be operated when the passenger is sitting on the vehicle seat. However, the controller 36 can be arranged and constructed to be operated when a vehicle collision is sensed or predicted. In such a case, a sensor for predicting the vehicle collision or a sensor for sensing the vehicle collision may preferably be used as the sensor TS (the main detecting device) so that a signal from such a sensor can be used as the initiation signal instead of the on-off signal of the seatbelt switch. When such a sensor is used as the sensor TS, in the step S1 in FIG. 6, the controller 36 determines as to whether a vehicle collision is sensed or predicted.

Further, in this embodiment, although the head to head rest clearance L can be determined based on changes of capacitance of the electrodes of the head sensor 31, it can also be determined based on the capacitance of the head sensor 31. Also, in this embodiment, although the moving mechanism 32 includes the back and forth moving mechanism 33 and the vertical moving mechanism 34, the moving mechanism 32 may include one of the back and forth moving mechanism 33 and the vertical moving mechanism 34, if necessary. Also, in this embodiment, although the vertical moving mechanism 34 is moved before the back and forth moving mechanism 33 is moved (steps SF and SU), the reverse order is possible. In addition, it is possible to move the back and forth moving mechanism 33 simultaneously with the vertical moving mechanism 34

Moreover, in this embodiment, the back and forth moving mechanism 33 is constructed to move the front portion 11 relative to the rear portion 12. However, it is possible to be constructed such that the head rest main body 10 can move relative to the seat back 3a.

Furthermore, in this embodiment, the optimal proximity position of the front portion 11 of the head rest main body 10 corresponds to the position shown in FIG. 11. However, the optimal proximity position is not limited to such a position. In other words, the optimal proximity position of the front portion 11 can be appropriately changed, if necessary.

Additional examples of relevant head rests are found in U.S. patent application Ser. No. 11/153,262, the contents of which are hereby incorporated by reference.

The invention claimed is:

1. A head rest of a vehicle seat, comprising:
   a head support portion for supporting a head of a passenger and a rear portion, the head support portion and the rear portion being separate from each other; and a drive unit for moving the head support portion, the drive unit having a moving mechanism that is arranged and constructed to move the head support portion vertically and back and forth relative to the vehicle seat, a head detecting device provided to the head support portion so as to detect a clearance between the passenger head and the head support portion and to generate a control signal representative of the detected clearance, and a controller that can control the moving mechanism, wherein the moving mechanism comprises a back and forth moving mechanism disposed between the head support portion and the rear portion of the head rest and a vertical moving mechanism disposed in a seat back of the vehicle seat, the back and forth moving mechanism including a pair of cross bar links that are arranged and constructed to be moved by an actuator for movement of the head support portion relative to the rear portion.

wherein the controller controls the moving mechanism so as to move the head support portion toward a first proximity position in which the head detecting device has a predetermined sensitivity relative to the passenger head if the head support portion does not reach the first proximity position, and wherein the controller further controls the moving mechanism based on the control signal from the head detecting device so as to move the head support portion to a second proximity position which corresponds to an optimal proximity position relative to the passenger head.

2. The head rest as defined in claim 1, wherein the controller moves the moving mechanism so as to vertically move the head support portion after the head support portion moves to the first proximity position, thereby scanning the passenger head so as to obtain passenger head data, and wherein the controller controls the moving mechanism based on the passenger head data so as to move the head support portion to the second proximity position.

3. The head rest as defined in claim 2, wherein the head detecting device comprises a capacitance sensor.

4. The head rest as defined in claim 3, wherein the controller controls the moving mechanism such that the head support portion moves vertically and back and forth relative to the vehicle seat when the head support portion moves to the second proximity position.

5. The head rest as defined in claim 1, wherein the head detecting device comprises a capacitance sensor.

6. The head rest as defined in claim 5, wherein the controller controls the moving mechanism such that the head support portion moves vertically and back and forth relative to the vehicle seat when the head support portion moves to the second proximity position.

7. A head rest of a vehicle seat, comprising:

a head support portion for supporting a head of a passenger and a rear portion, the head support portion and the rear portion being separate from each other; and a drive unit for moving the head support portion, the drive unit having a moving mechanism that is arranged and constructed to move the head support portion vertically and back and forth relative to the vehicle seat, a head detecting device provided to the head support portion so as to detect a clearance between the passenger head and the head support portion and to generate a control signal representative of the detected clearance, and a controller that can control the moving mechanism, the controller comprising:

a means for moving the head support portion forwardly so as to be positioned at a first proximity position in which the head detecting device has a predetermined sensitivity relative to passenger head, means for scanning the passenger head so as to obtain passenger head data, means for processing the passenger head data and determining a second proximity position which corresponds to an optimal proximity position relative to the passenger head, and a means for moving the head support portion vertically and back and forth so as to be positioned at the second proximity position, wherein the moving mechanism comprises a back and forth moving mechanism disposed between the head support portion and the rear portion of the head rest and a vertical moving mechanism disposed in a seat back of the vehicle seat. the back and forth moving mechanism including a pair of cross bar links that are arranged and constructed to be moved by an actuator for movement of the head support portion relative to the rear portion.

8. The head rest as defined in claim 7, wherein an optimal vertical basis of the second proximity position is defined by is positioned intermediate a top of the passenger head and a center of a neck of the passenger, the distance between the top of the passenger head and the horizontal plane being substantially twice the distance between the center of the neck of the passenger and the horizontal plane.

* * * * *